US009804875B2

(12) United States Patent
Vermande et al.

(10) Patent No.: US 9,804,875 B2
(45) Date of Patent: Oct. 31, 2017

(54) SOFTWARE COMPONENT AND DEVICE FOR THE AUTOMATED PROCESSING OF MULTI-PURPOSE DATA, EMPLOYING FUNCTIONS REQUIRING DIFFERENT SECURITY LEVELS OR RESPONSIBILITY LIMITS

(75) Inventors: Severine Vermande, Cepet (FR); Philippe Biondi, Paris (FR)

(73) Assignee: AIRBUS (S.A.S.), Blagnac (FR)

( * ) Notice: Subject to any disclaimer, the term of this patent is extended or adjusted under 35 U.S.C. 154(b) by 1282 days.

(21) Appl. No.: 13/387,561

(22) PCT Filed: Jul. 28, 2010

(86) PCT No.: PCT/FR2010/000552
§ 371 (c)(1),
(2), (4) Date: Mar. 15, 2012

(87) PCT Pub. No.: WO2011/020954
PCT Pub. Date: Feb. 24, 2011

(65) Prior Publication Data
US 2012/0167089 A1 Jun. 28, 2012

(30) Foreign Application Priority Data
Jul. 28, 2009 (FR) .................................... 09 55281

(51) Int. Cl.
*G06F 9/455* (2006.01)
*G06F 21/57* (2013.01)
*G06F 21/74* (2013.01)
*G06F 21/53* (2013.01)

(52) U.S. Cl.
CPC .......... *G06F 9/45558* (2013.01); *G06F 21/57* (2013.01); *G06F 21/74* (2013.01); *G06F 21/53* (2013.01); *G06F 2009/45587* (2013.01); *G06F 2221/2113* (2013.01)

(58) Field of Classification Search
CPC .......... G06F 21/53; G06F 21/57; G06F 21/74; G06F 2221/2113; G06F 2009/45587; G06F 9/45558
See application file for complete search history.

(56) References Cited

U.S. PATENT DOCUMENTS 5,442,645 A * 8/1995 Ugon et al. ................... 714/736
5,809,493 A * 9/1998 Ahamed ................ G06N 5/025
706/52
6,941,410 B1 * 9/2005 Traversat et al. ................. 711/6

(Continued)

OTHER PUBLICATIONS

International Search Report dated Feb. 22, 2011 in PCT/FR10/00552 Filed Jul. 28, 2010.

*Primary Examiner* — Meng An
*Assistant Examiner* — Caroline H Arcos
(74) *Attorney, Agent, or Firm* — Oblon, McClelland, Maier & Neustadt, L.L.P.

(57) ABSTRACT

A software component for automated processing of multi-usage data, implementing functions requiring various levels of security or limits of responsibility. The software component includes a plurality of virtual machines, each virtual machine being adapted for executing at least one function requiring a level of security or a limit of responsibility which is predetermined and a hypervisor adapted for controlling execution of the plurality of virtual machines.

16 Claims, 5 Drawing Sheets

(56) References Cited

U.S. PATENT DOCUMENTS

| | | | |
|---|---|---|---|
| 7,881,755 B1* | 2/2011 | Mishra | H04W 52/0229 455/574 |
| 8,387,046 B1* | 2/2013 | Montague et al. | 718/1 |
| 2002/0169987 A1 | 11/2002 | Meushaw et al. | |
| 2005/0223220 A1 | 10/2005 | Campbell et al. | |
| 2008/0134176 A1* | 6/2008 | Fitzgerald et al. | 718/1 |
| 2008/0134177 A1* | 6/2008 | Fitzgerald et al. | 718/1 |
| 2008/0134178 A1* | 6/2008 | Fitzgerald | G06F 9/45537 718/1 |
| 2008/0216096 A1 | 9/2008 | Wang | |
| 2008/0256536 A1* | 10/2008 | Zhao | G06F 9/45537 718/1 |
| 2009/0113110 A1* | 4/2009 | Chen | G06F 9/4426 711/6 |
| 2009/0133097 A1* | 5/2009 | Smith et al. | 726/1 |
| 2009/0254990 A1* | 10/2009 | McGee | 726/22 |
| 2010/0023996 A1* | 1/2010 | Sabin | G06F 21/53 726/1 |

* cited by examiner

SOFTWARE COMPONENT AND DEVICE FOR THE AUTOMATED PROCESSING OF MULTI-PURPOSE DATA, EMPLOYING FUNCTIONS REQUIRING DIFFERENT SECURITY LEVELS OR RESPONSIBILITY LIMITS

This invention relates to systems for processing of data, especially data of aircraft information systems, and more particularly to a software component and a device for the automated processing of multi-usage data, implementing functions requiring various levels of security or limits of responsibility.

BACKGROUND

Ever since the tragic events of Sep. 11, 2001 linked to commercial airplane crashes, security has represented a basic problem for aeronautics. In order to respond to this, the manufacturers and the airline companies developed and integrated functions intended to improve security on board aircraft.

Thus, by way of illustration, reinforced cockpit doors and internal video monitoring systems were developed. Likewise, the on-board systems from now on are protected against malicious intents.

Furthermore, the airline companies have the regulatory requirement to implement technical and organizational means for maintaining the security level of the components of an aircraft such as established at delivery thereof. This regulatory obligation covers only physical security and not logical security.

Nevertheless, as a result of this regulatory requirement, certain airline companies are asking the aircraft manufacturers to allow the integration of security functions into the operational processes of the airline companies. Moreover, certain airline companies are asking the aircraft manufacturers for the operational functions and the associated security functions to be compatible with commercial hardware and software not specific to aeronautics.

In general, the systems for automated processing of data, also called STADs (acronym for Système de Traitement Automatisé de Données [System for Automated Processing of Data]), may be used, in an aeronautical environment, to accommodate operational and/or communication software applications, that is to say as toolboxes, to enable the operational personnel, for example the pilot and his second in command, the technicians and the maintenance crews, to carry out some of the tasks of their mission. These toolboxes also may be available for other usages. In particular, an airline company may decide to install its own technical or office automation applications therein. The toolboxes are not security functions, that is to say their role is not to ensure security, but to make it possible to perform operational tasks.

The data handled by the operational software applications implemented in the STADs may be downloaded, calculated, displayed and/or transmitted. Because of the security constraints cited above, there are high security requirements in terms of confidentiality, integrity and/or availability of same.

Nevertheless, it is difficult to have sensitive functions and data coexist with functionalities able to communicate with the outside and which depend on commercial software and hardware when a security objective must be respected.

BRIEF SUMMARY

The invention makes it possible to resolve at least one of the problems set forth above.

The invention thus has as an object a computer software component adapted for the automatic processing of multi-usage data, the software component implementing functions requiring various levels of security or limits of responsibility and comprising,
- a plurality of virtual machines, each virtual machine being adapted for running at least one function requiring a predetermined level of security or a limit of responsibility; and
- a hypervisor adapted for controlling the running of the plurality of virtual machines.

In this way the software component according to the invention makes it possible to implement functions having various levels of security or limits of responsibility in the same machine, irrespective of the hardware platform and the architecture of the information system used on board aircraft. The editors of the software applications implemented therefore no longer are dependent on the evolution of the operating systems and they control the life cycle of these applications.

The software component thus may be implemented on a mobile STAD on the market, in accordance with a hardware compatibility list. Since the limits of responsibility are clearly identified, it may accommodate software applications of suppliers and of the user. Such a STAD may be associated with an aircraft or with a user.

The use of the software component according to the invention does not increase the maintenance requirements in comparison with a mono-usage equipment item, mobile or otherwise. It provides a good level of segregation as well as a good level of security including the integrity of the operational data. It makes it possible to control the sharing of resources among the various functions while being relatively independent as regards the reliability shortcomings of the commercial products used.

The hypervisor advantageously comprises authentication means for authenticating at least one virtual machine of the plurality of virtual machines so as, in particular, to control the validity of transmitted data. The authentication means likewise preferably ate adapted for verifying the integrity of the at least one authenticated virtual machine.

Moreover, the authentication means advantageously are adapted for verifying the level of isolation of the at least one authenticated virtual machine in relation to at least one other virtual machine of the plurality of virtual machines so as, in particular, to control the validity of data transmitted with regard to other virtual machines.

According to a specific embodiment, the software component further comprises means for storage of data processed by at least one virtual machine of the plurality of virtual machines, the storage means being adapted for storing the processed data in a removable memory of the computer. In this way the software component according to the invention makes it possible to store data the confidence level of which is uncertain, without compromising it. Such data storage means preferably are implemented by virtual machines of the plurality of virtual machines the security level of which is lower than a predetermined threshold.

Still according to a specific embodiment, the software component further comprises means for checking a confidence level of at least one datum processed by at least one virtual machine of the plurality of virtual machines, the at least one processed datum being unable to be stored locally in the computer until after it has been checked. In this way the software component according to the invention makes it possible to store locally only data the confidence level of which is certain so as not to compromise it.

Still according to a specific embodiment, the software component further comprises means for data transfer between a first and a second virtual machine of the plurality of virtual machines, the transfer means being adapted for filtering transferred data if the security level of the second virtual machine is higher than the security level of the first virtual machine so as to validate the exchanged data, in particular according to their type or the need for access to these data.

Still according to a specific embodiment, configuration data used for starting up at least one virtual machine of the plurality of virtual machines are not modified during the running of the at least one virtual machine started up so as to facilitate maintenance of the software component and to allow restarting thereof from a stable and validated state.

The invention also has as an object a device comprising means adapted for the use of each of the elements of the software component described above, the advantages of which are similar to those cited above.

BRIEF DESCRIPTION OF THE DRAWINGS

Other advantages, purposes and characteristics of this invention become apparent from the detailed description that follows, presented by way of non-limitative example, with reference to the attached drawings in which.

DETAILED DESCRIPTION

The invention makes it possible in particular to replace the mobile or fixed systems for automated processing of data (STAD) that is mono-usage, currently used for the maintenance and mission, with a single secured, preferably mobile, STAD.

Figure 1:
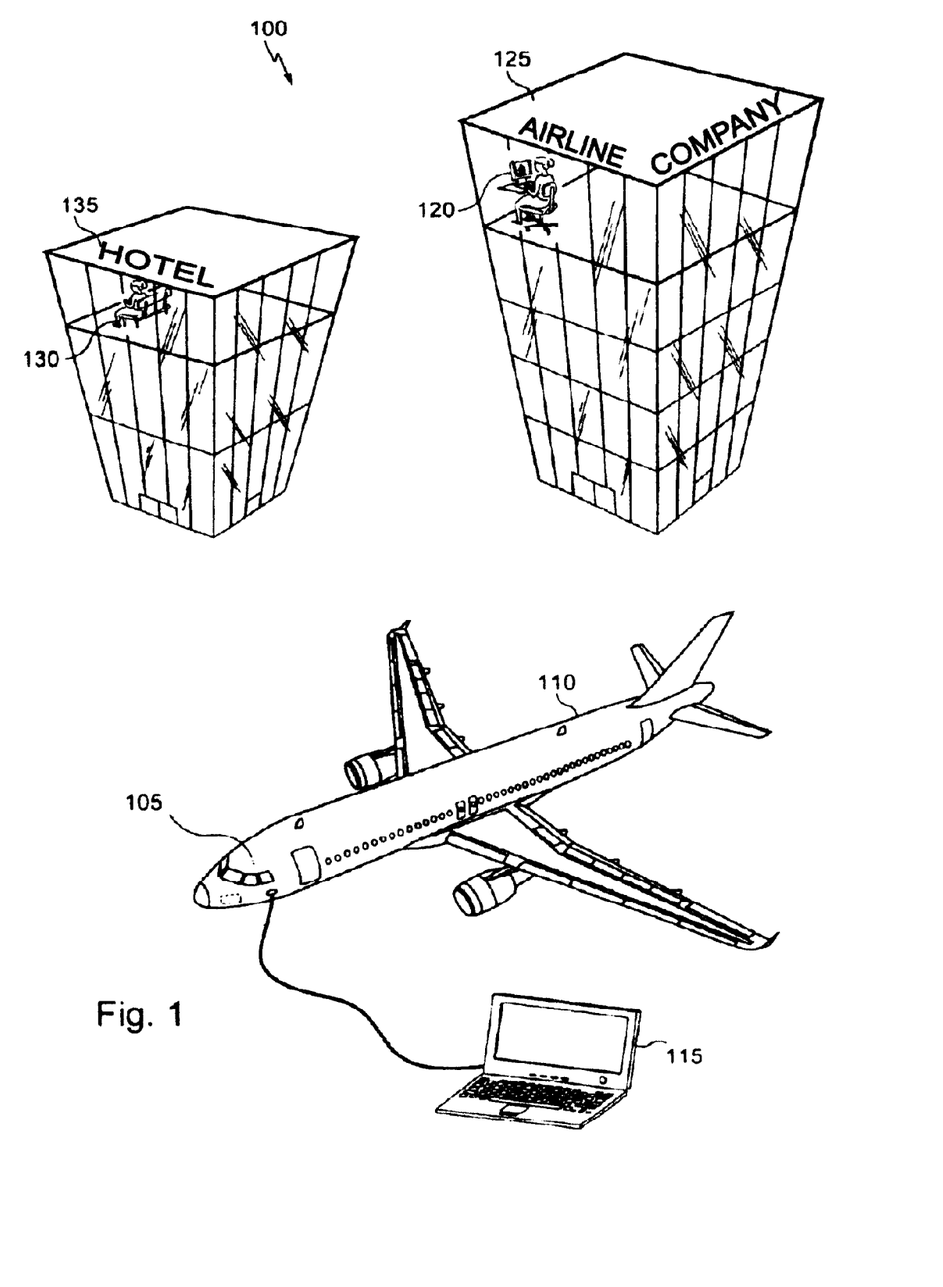
FIG. 1 schematically shows an exemplary environment in which a system for automated processing of multi-usage data implementing the invention may be used.

FIG. 1 schematically shows an exemplary environment 100 in which a system for automatic processing of multi-usage data implementing the invention may be used. According to this example, a STAD 105 may be used by a crew member in an aircraft 110 for example to run flight management software operations.

The same STAD 105, or a similar STAD 115, may be used by a maintenance crew to access maintenance data for aircraft 110 and/or to update data or software applications for the aircraft.

Furthermore, the same STAD 105, or a similar STAD 120, may be used in the offices 125 of the airline company, for example for preparation of a flight. Similarly, the same STAD 105, or a similar STAD 130, may be used by its holder to access office automation applications and his e-mail from, for example, a network access in a hotel 135.

It should be noted here that the examples illustrated on FIG. 1 are provided only by way of illustration. They are not limitative.

In order to allow implementation of functions requiring various levels of security on a single STAD, without compromising the security of each of these functions, several techniques are combined.

The operational applications, office automation applications and personal applications of a STAD, more generally all the functions implemented in a STAD, thus are accommodated in several virtual machines implemented in the STAD, according to security-level requirements and, preferably, by responsibility.

It is recalled here that a virtual machine provides a running environment having its own configuration characteristics. In other words, two virtual machines may be considered as two independent physical machines. Each virtual machine is run with its operating system, its drivers (called drivers in English terminology), its software applications and its data management and exchange configuration.

A virtualization mechanism allows in particular the running of several virtual machines on a real machine with the aid of a hypervisor.

The hypervisor is responsible for sharing resources of the real machine and for application of the rules for control of access to the resources. The resources shared among the virtual machines are, for example, the computing capacity CPU (abbreviation for Central Processing Unit in English terminology), the communications channels, the hardware and software interruptions, the input/output ports, the memory, the clocks, the bus systems, the controllers and/or the mass memory. The invention is based on the use of a standard hypervisor, customized for managing the virtual machines according to predetermined rules.

The virtualization implemented here is a hardware virtualization, for example a complete virtualization according to which the hypervisor manages all the requests of the virtual machines or a paravirtualization according to which some requests are managed directly by the virtual machines.

According to a specific embodiment, virtualization software tools adapted to real time are used for their advantages in terms of performance and level of security.

Furthermore, for on-board systems, it is seen that virtualization allows optimizing the weight of the computer hardware used, including the servers, the switches and the wiring, but also a reduction in power consumption as well as a simplification of the deployment and maintenance procedures, which is particularly advantageous in an aeronautical environment.

Figure 2:
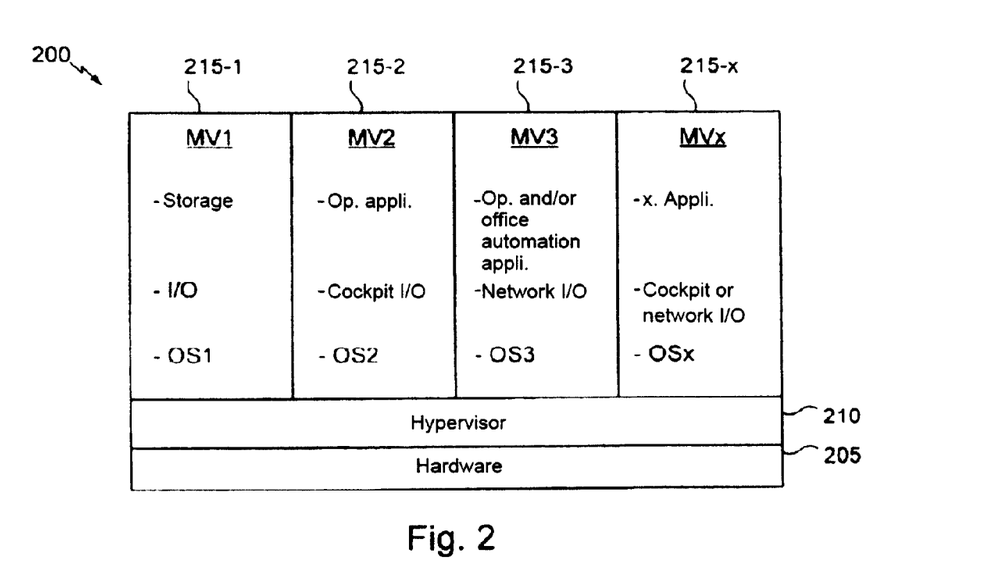
FIG. 2 illustrates an exemplary architecture of a system for automated processing of multi-usage data according to the invention.

FIG. 2 illustrates an exemplary architecture of a STAD according to the invention, sufficiently reliable to be used in environments having various levels of security.

As shown, STAD 200 here comprises a hardware layer 205. The latter corresponds, for example, to that of a portable personal computer, also called laptop or notebook in English terminology, of a personnel assistant, also called PDA (abbreviation for Personal Digital Assistant in English terminology), or of a smartphone.

Since the hardware layer must be reliable, it may consist of a PC-type open platform the confidence level of which is enhanced by the use of an authentication module called TPM (abbreviation for Trusted Platform Module in English terminology). It involves a cryptographic hardware component defined by the Trusted Computing Group.

Hardware layer 205 allows running of a software layer 210 comprising the hypervisor. It makes it possible to run several separate virtual machines, for example virtual machines MV1, MV2, MV3 and MVx, referenced 215-1, 215-2, 215-3 and 215-x, respectively.

A first virtual machine, here virtual machine 215-1, has a specific role and authorizations. It is the management machine that serves as access for the maintenance and configuration of the platform. Here it uses an OS1 operating system. Still according to this example, virtual machine 215-1 comprises a storage space, or mass memory, and a communication interface, marked I/O (abbreviation for Input/Output in English terminology).

A second virtual machine, here virtual machine 215-2, allows the STAD to be connected to the most sensitive information system, that is to say the one for the aircraft. The display linked to this virtual machine may be directed to the STAD screen or to specific screens of the aircraft, in accordance, for example, with a standard graphical user interface of client/server type.

Virtual machine 215-2 here uses operating system OS2 and an input/output interface making it possible to exchange data with the information system of the aircraft via a cockpit docking-station type link. Virtual machine 215-2 makes it possible to run operational applications. The peripherals that are available in this environment as well as the management authorizations should be precisely defined in order to ensure the required level of security.

A third virtual machine, here virtual machine 215-3, allows the STAD to be connected to information systems that are not very sensitive, here systems separate from the information system of the aircraft. By way of illustration, virtual machine 215-3 allows the STAD to access an internal network of the company using the STAD or the Internet network, for example a WiFi access connection in a hotel.

The risks associated with virtual machine 215-3 are higher than those of virtual machines 215-1 and 215-2 because it is open to environments capable of being a source of compromise. This virtual machine therefore may be a target for malevolent software, called malware in English terminology. Moreover, since the software applications and the drivers implemented in this virtual machine are a priori standard software, they represent potentially known weaknesses.

Furthermore, the designer and/or the company using the STAD may decide to create one or more other virtual machines 215-x in order to meet specific needs. By way of illustration, a virtual machine 215-x may be used for the running of software applications requiring a level of security equivalent to that of virtual machine 215-2 but the supplier of which is different from that of the applications run in virtual machine 215-2. Thus, by dissociating the running environments of the applications according to levels of required security and responsibilities, it is possible to use a single STAD.

The running level advantageously is constrained in the user space at start-up of the STAD so that the management authorizations are not accessible. Moreover, the connection banner preferably is deactivated in order to prevent a user from exiting from the virtualization layer. In this way it accesses only virtual machines. Still advantageously, the sequence of starting keys is deactivated. Furthermore, if hardware virtualization functionalities are implemented in the processor of the STAD, they are configured so as not to erode the level of security expected.

At start-up of the STAD or at the time of its activation, for example after a placement on standby, the user is authenticated. Such an authentication here is accomplished by the hypervisor. Access to the virtual machines is contingent upon this authentication. Thus, for example, a pilot and a copilot will be able to access all the virtual machines implemented on a STAD, with the exception of the management virtual machine used to configure the STAD, while a maintenance technician will be able to access the latter. The virtual machines may be started automatically at start-up of the STAD or at the request of the user. Each virtual machine may be started up and stopped independently, according to the needs of the user. The latter may change from one virtual machine to another according to a standard mechanism, for example via a graphical interface.

According to a specific embodiment, the functions implemented in the virtual machines are adapted in accordance with certain parameters such as the level of security of the virtual machine in which they are run.

Figure 3:
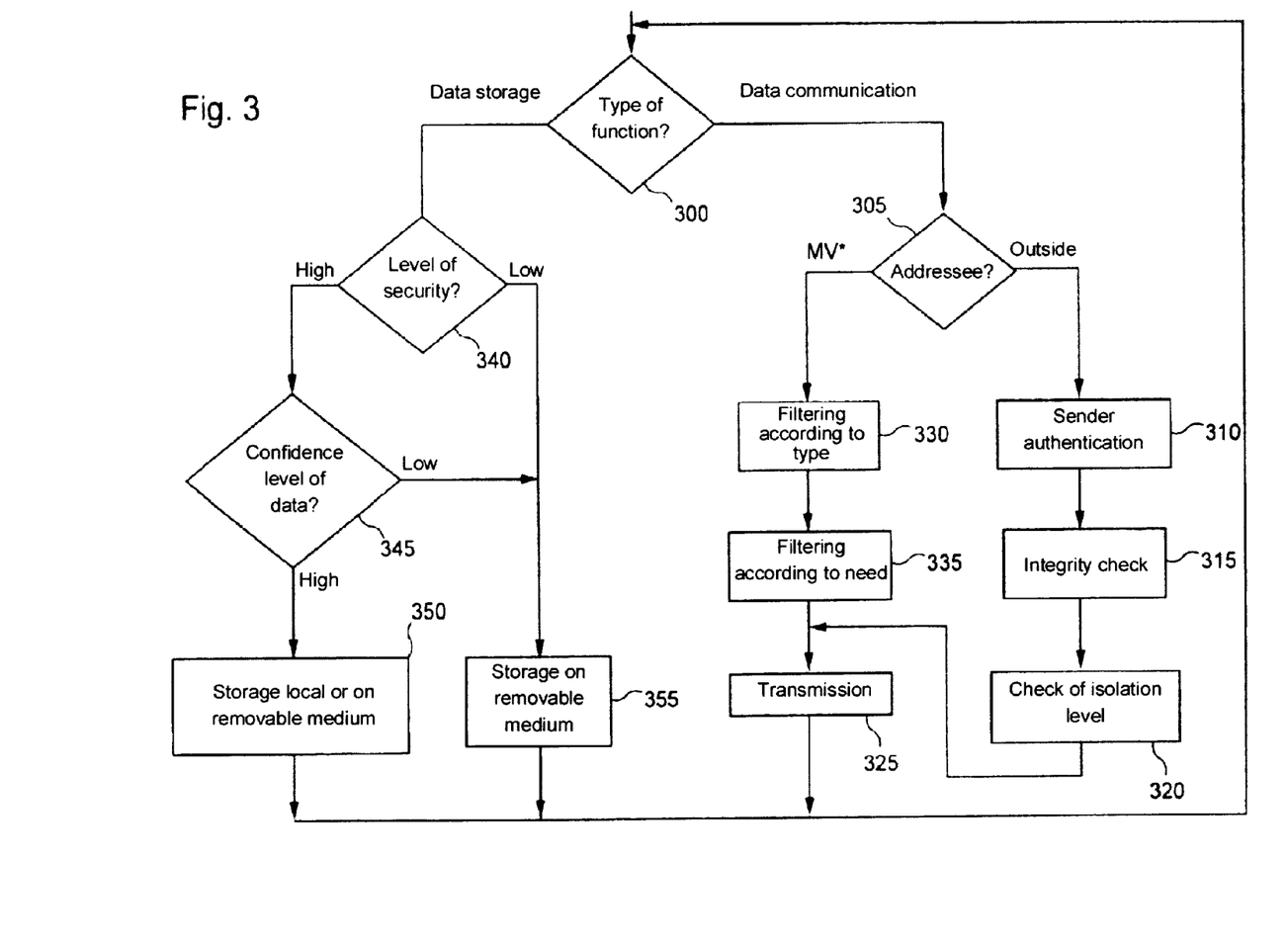
FIG. 3 schematically illustrates an exemplary adaptation of certain functions run in machines.

FIG. 3 schematically illustrates an exemplary adaptation of certain functions run in virtual machines according to these parameters, in accordance with the type of function (step 300).

Thus, for example, for a communication function making it possible to transmit data, the virtual machines or some of them, undergo an authentication phase in order to be connected to certain systems external to the STAD (step 305), for example to an information system of an aircraft. This authentication phase, implemented by the hypervisor at the time of starting of the virtual machine and/or exchange of data, comprises the following steps, authentication of the virtual machine according to a standard authentication mechanism (step 310);

verification of the integrity of the virtual machine by checking, for example, several security criteria such as the operating system and the date of last updating (step 315); and, verification of the level of isolation of the virtual machine in relation to the other virtual machines according to the functions implemented (step 320). This step makes it possible to verify that no other virtual machine can interact with the one for which authentication is requested, for example via the user interface or the network, when the virtual machine is connected with a system of an aircraft. Alternatively, this step may consist in verifying observation of predetermined communication rules.

In this way, the data are not actually transmitted (step 325) until after authentication of the virtual machine so that it cannot transmit erroneous data to an external system.

Likewise, the transfer of data between virtual machines is checked in order to ensure the levels of required security. In fact, whether they had been isolated for requirements of limit of responsibility or even various levels of security, certain functions may require a transfer of data between virtual machines and therefore defining of a communication channel.

In this way, an import function is created in order to validate the data passing in transit to a virtual machine having a level of security higher than that of the source virtual machine (marked MV* on FIG. 3). The principle of this function is in particular to filter the data according to their type (step 330) and to ensure that only the expected data (step 335) pass in transit through the open communication channel (step 325). Nevertheless, the user remains in control of the validation, that is to say the actual transfer of the data from one virtual machine to another having a higher level of security.

In order to improve maintenance operation for the STADs, a mechanism for instant photographs, called snapshots in English terminology, preferably is implemented.

The snapshots function makes it possible to store all the data relating to a virtual machine, at a given instant, so that the virtual machine may be restarted and reconfigured later in order to be restored to the state in which it was when the data were stored in photographic form. This function may be activated by a user or automatically according to a predetermined periodicity, for example every week or every month, or in response to specific events.

Moreover, in order to ensure a level of security for the STADs, a specific mechanism for data writing management is implemented in each virtual machine. This mechanism here is based on the functions of image copying during writing, called copy-on-write in English terminology, as well as prohibiting writing of certain data in the mass memory of the STAD.

According to the function of copied images during writing, all the data used by a virtual machine during its start-up are copied and only this copy is used by the virtual machine. In this way, at each following start-up of the virtual machine, the same data as those used for the preceding start-up are used even if these data were modified afterwards.

The combination of these functions makes it possible to ensure the levels of security while preventing the STADs from requiring any more maintenance than standard equipment items. In fact, if a virtual machine is compromised, it is sufficient to restore it from a snapshot taken from a stable state in order to regain a functional system.

Advantageously, for the purpose of not corrupting the platform, only the necessary operations are authorized to write data in the mass memory of the STAD, according to the level of security of the virtual machine (step 340). For example, only the operational data and the data of the user expressly identified may be stored in the STAD. Moreover, if the level of security of the virtual machine is high, only data the confidence level of which is verified may be stored in the STAD (steps 345 and 350). Such a verification consists, for example, in validating the integrity or the origin of the data or in verifying the environment in which they were produced. Nevertheless, even if such data may be stored in the STAD, they preferably are stored in a removable medium, such as an SD (abbreviation for Digital Secure in English terminology) or USB-key type card, in order to facilitate replacement of a STAD by avoiding the step of recovery of data. Data the confidence of level of which is not verified may be stored in such a removable medium (step 355).

A specific processing is carried out for data that the user acquires from a virtual machine the level of security of which is low, that is to say the level of security of which is lower than a predetermined threshold, for example when a virtual machine may access Internet and therefore receive messages, applications and markers (commonly called cookies in English terminology) or when peripherals such as storage peripherals may be connected to the STAD. In this case, for operational and security reasons, these data may be stored only on a removable medium such as an SD or USB-key type card (step 355).

As indicated above, each virtual machine here corresponds to a required predetermined level of security, the applications, for example the operational applications, the office automation applications and the personal applications of the user being distributed in several virtual machines by required levels of security according to the functions which they require. Thus, in order to obtain a satisfactory general level of security, it is important to configure the hypervisor and the virtual machines skillfully, taking into account in particular good practices, strictly necessary drivers and communication means supporting the functions of the STAD so as to reduce the attack surface as much as possible and thus not erode the level of security.

Figure 4:
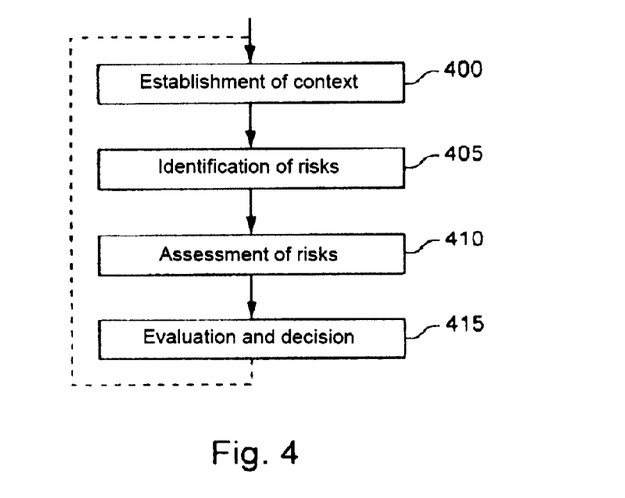
FIG. 4 schematically illustrates certain steps implemented in order to analyze the risks associated with functions to be run on the same STAD.

FIG. 4 schematically illustrates certain steps implemented in order to analyze the risks associated with functions to be run on the same STAD. These risks make it possible to define the virtual machines to be implemented in the STAD and the distribution of these functions in the virtual machines used.

This analysis consists in particular in determining the parameters for running the functions so as to determine, in particular, the communication interfaces that may be used, the operating system used and the origin of the processed data. These parameters make it possible to characterize the parameters of the virtual machine capable of implementing the function and to define a level of security.

It should be noted that a level of security also may be directly associated with a function, for example if it is prescribed.

A first step (step 400) has the purpose of analysis of the context so as to determine the parameters making it possible to evaluate the risk of each function.

Since the risks here are evaluated in the case of a loss of confidentiality, integrity, availability or authenticity, the parameters that may be taken into account for evaluating in particular may be the following, the strategic value of the information items in relation to the commercial activity;
the criticality of the information items in relation to the security of property and persons;
the regulatory and contractual requirements;
the operational importance of confidentiality, integrity, authenticity and availability of the processed information items; and
the expectations and perception of the parties concerned as well as the consequences for the public image.

These parameters are used for drawing up an evaluation grid which defines zones for each identified risk. By way of illustration, this grid may comprise three zones corresponding to low, medium and high risks. The processing associated with each zone, making it possible in particular to identify the risks of functions to be implemented, preferably is predetermined so as to allow comparison and reproducibility of results. In other words, step 300 makes it possible to establish the context of the analysis of functions to be implemented in a STAD in order to meet specific requirements.

In a second step (step 405), the risks are identified. Here, after the list of property to be protected has been defined and the responsibilities have been identified, the potential threats as well as the vector for these threats and the means for mitigation already implemented are identified. It should be noted that the lists used must be sufficiently detailed to enable making a decision as to the required levels of security.

In a following step (step 410), the risks are assessed by intersecting the information items obtained above with the known vulnerabilities as well as the type and the level of consequences in the event of exploitation of a vulnerability and the probability of an attack. This step makes it possible in particular to evaluate the possible consequences for a given risk according to the operational context and to establish a list of risks to which a function may be subject.

Finally, in a following step (step 415), the level of risk is evaluated for each function, using the grid established above and the associated processings. Depending on the result obtained, it may be decided to resume the risk-analysis process (repetition of steps 400 to 415) with an implementation variant so as, for example, to reduce the risk associated with a function by imposing additional constraints.

The steps described with reference to FIG. 4, applied to the functions which are to be accommodated in the STAD, make it possible to define the required level of security for each function. These results, if need be combined with a responsibility criterion, make it possible to define the functions grouped together in a virtual machine. As indicated above, the use of a responsibility criterion makes it possible to define limits of responsibility among the various participants the functions or the applications of which are implemented in the STAD. For example, it is possible to define a virtual machine for each participant so that each is responsible for its part.

Thus, by way of illustration, four virtual machines may be implemented according to the following layout, virtual machine F1 for the running of applications requiring a high level of security. This virtual machine is isolated from the others in order to make it possible to follow the responsibility of supplier 1;

virtual machine F2 for the running of applications requiring a high level of security. This machine is isolated from the others in order to make it possible to follow the responsibility of supplier 2;

virtual machine F3 for the running of applications requiring a medium level of security; and virtual machine F4 for the running of applications requiring a low level of security.

It should be noted that the management virtual machine used for the management of the other virtual machines, created by the hypervisor at the time of installation, has a purely technical and non-operational use. In particular, the user authorizations for access to the other machines are managed from this virtual machine.

Figure 5:
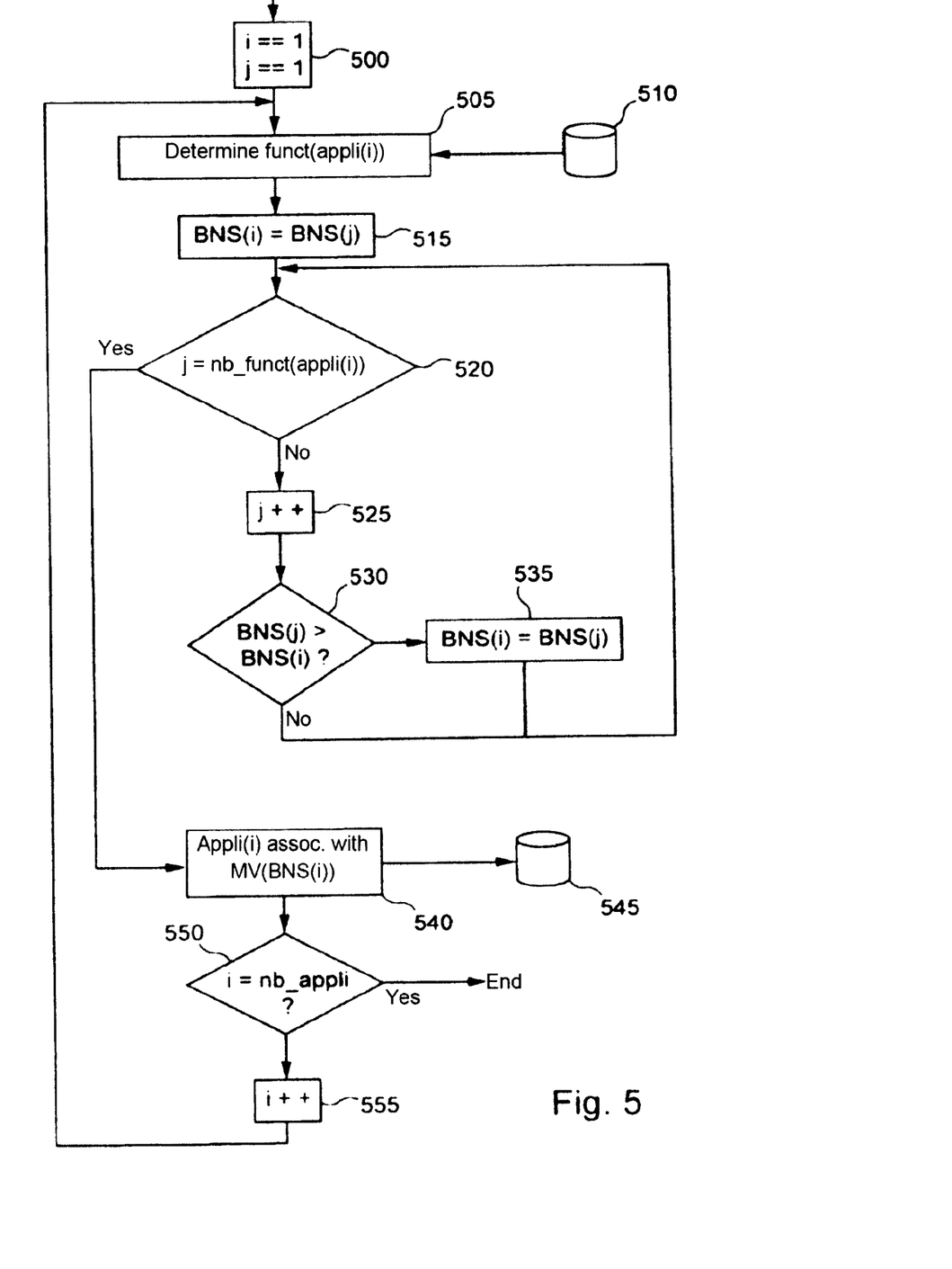
FIG. 5 schematically illustrates an exemplary algorithm for distributing software applications implemented in a STAD in virtual machines according to the functions which they require.

FIG. 5 schematically illustrates an exemplary algorithm for distributing software applications implemented in a STAD in virtual machines according to the functions they require.

A variable i, representing the index of the software applications implemented in the STAD, and a variable j, representing the index of the functions called up by the application having index i, are initialized at the value one (step 500). The functions required by the application having the index i are determined (step 505). They are stored here in table form in database 510.

The required level of security of the application having i for index, called BNS(i), then is defined as being the required level of security of the function having j for index, called BNS(j) (step 515).

A test then is performed (step 520) in order to determine whether the value of the index j corresponds to the number of functions required by the function having i for index. If so, index j is incremented by one (step 525) and another test is performed (step 530) in order to determine whether the required level of security of the function having j for index (BNS(j)) is higher than the required level of security of the application having i for index (BNS(i)). If so, the required level of security of the application having i for index (BNS(i)) is defined as being the required security level of the function having j for index (BNS(j)) (step 535). The algorithm then continues to step 520.

If the value of index j corresponds to the number of functions required by the function having i for index, the application having i for index is associated with the virtual machine the level of security of which corresponds to BNS(i) (step 540). This information here is stored in database 545.

The value of index i then is compared with the number of applications implemented by the STAD in order to determine whether all the applications have been associated with a virtual machine (step 550). If so, the process ends. Otherwise, index i is incremented by one and the preceding steps (steps 505 to 550) are repeated.

As described above, it is possible to create virtual machines independently of each other so as to allow their integration within a hypervisor according to specific needs. Moreover, such an embodiment allows various participants to integrate their applications according to their needs. In this way each participant, being responsible for one or more virtual machines, may provide an assurance in terms of functional security.

Thus, by using the architecture of the STAD and the algorithms described above, a supplier of applications may deliver one or more virtual machines integrating its applications and communicate the operating mode for installation of the recommended software platform (virtualization-based) on the STAD. The latter also may be supplied with the hypervisor and the virtual machine or machines preinstalled.

Moreover, as indicated above, clients may use a USB key or an SD card for storing the profile and user data such as an e-mail identifier, cookies and favorites of an Internet browser, as well as connection scripts. In this way, the STADs are interchangeable and may be managed as a fleet.

A common software base advantageously is installed on a fleet of STADs, for all the usages and all the types of aircraft to which the STADs are able to be connected. The virtual machine or machines corresponding to the types of use and/or aircraft then are installed. At the end of the configuration, one or more reference images are created in order to allow configuration of the STAD during its use. These reference images also may be restored by the user without turning to a technician.

By way of illustration, the toolbox known under the name of Electronic Flight Bag (EFB) is considered here. It involves a box of tools from which a pilot and his second in command prepare a mission to be carried out. The EFB is not an application having a high level of security.

There basically are three classes of EFB defined as follows, class 1: the mission data are loaded into a portable STAD from the ground. The STAD is taken on board the aircraft but it is not connected to the on-board information system. Data are exchanged with the ground only after landing;

class 2: it involves a standard portable STAD, associated with a pilot. The STAD exchanges data with the ground, in particular the airline company and the airport, and with the information system of the aircraft during all flight phases; and class 3: the STAD is integral with the cockpit and may access the critical systems that require a high level of certification.

Class 2 EFBs therefore may be managed by a STAD in accordance with the invention. In this case, the supplier of EFBs delivers the operational applications or a portion thereof to the client. It communicates thereto the list of compatible systems and the minimal configuration for the hypervisor or delivers the STAD with the hypervisor and the virtual machines preinstalled.

During an initial preparation phase, the client prepares the virtual machines according to the operational applications and the configuration data received. It also prepares the virtual machines making it possible to implement the specific applications of the company, for example e-mail applications.

In this way, by using the virtual machines created, a computer technician may install the hypervisor for the STAD which then makes it possible to use the computer capabilities of the company, the functionalities of the EFB and, if need be, others.

So that the STADs may be interchangeable, the data of the users preferably are stored in a removable memory card, for example an SD-type card, and not on the internal hard disk of the STADs.

In use, when a compromise is detected on a virtual machine, for example a virtual machine that is connected to an Internet site, the user may restart the virtual machine by using the most recent associated reference image without turning to a technician.

Likewise, in the event of hardware failure of a STAD, the technician retrieves the memory card from the user and inserts it into another STAD of the fleet. He does not need to customize this STAD or copy the user data.

Figure 6:
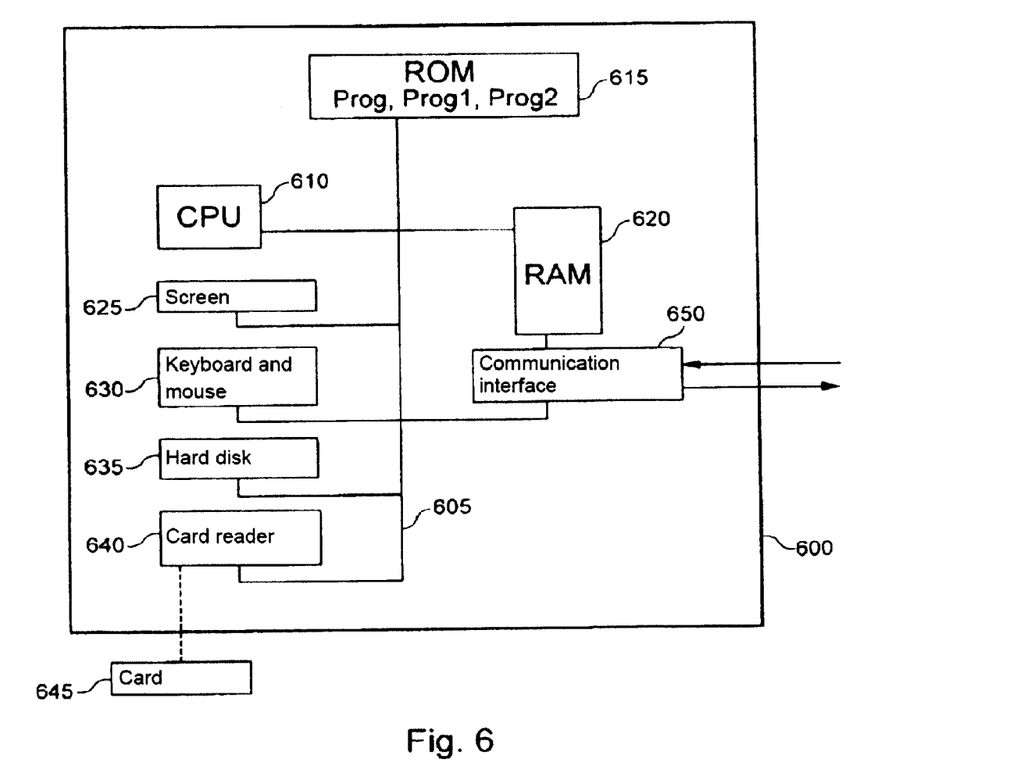
FIG. 6 shows an exemplary device making it possible to implement the invention at least partially.

FIG. 6 illustrates an exemplary hardware architecture adapted for implementing the invention. Device 600 here comprises a communication bus 605 to which there are connected:
- a central processing unit or microprocessor 610 (CPU, abbreviation for Central Processing Unit in English terminology);
- a read-only memory 615 (ROM, acronym for Read Only Memory in English terminology) that can comprise the programs necessary for implementation of the invention;
- a random access or cache memory 620 (RAM, acronym for Random Access Memory in English terminology) comprising registers adapted for recording variables and parameters created and modified in the course of running the aforesaid programs; and
- a communication interface 650 adapted for transmitting and receiving data.

Device 600 preferably also has the following components:
- a screen 625 making it possible to display data such as representations of commands and serve as graphical interface with the user who will be able to interact with the programs according to the invention, with the aid of a keyboard and a mouse 630 or another pointing device such as a touch screen or a remote control;
- a hard disk 635 that can comprise the aforesaid programs and data processed or to be processed according to the invention; and
- a memory card reader 640 adapted for receiving a memory card 645 and for reading therein or for writing therein data processed or to be processed according to the invention.

The communication bus permits communication and interoperability among the various components included in device 600 or connected thereto. The depiction of the bus is not limitative and, in particular, the central unit is able to communicate instructions to any component of device 600 directly or through another component of device 600.

The executable code of each program permitting the programmable device to implement the processes according to the invention may be stored, for example, on hard disk 635 or in read-only memory 615.

According to a variant, memory card 645 may contain data, in particular a table of correspondence between the events detected and the commands that may be requested, as well as the executable code of the aforesaid programs which, once read by device 600, is stored on hard disk 635.

According to another variant, the executable code of the programs will be able to be received, at least partially, through interface 650, to be stored in a manner identical to that described above.

More generally, the program or programs will be able to be loaded into one of the storage means of device 600 before being run.

Central unit 610 is going to control and direct the running of the instructions or portions of software code of the program or programs according to the invention, which instructions are stored on hard disk 635 or in read-only memory 615 or else in the other aforesaid storage components. During boot-up, the program or programs which are stored in a non-volatile memory, for example hard disk 635 or read-only memory 615, are transferred to random access memory 620 which then contains the executable code of the program or programs according to the invention, as well as the registers for storing the variables and parameters necessary for implementation of the invention.

Naturally, to satisfy specific needs, an individual competent in the field of the invention will be able to apply modifications in the foregoing description.

The invention claimed is:

1. A system having a computer for automatic processing of multi-usage-data by a plurality of virtual machines (VM) including a first virtual machine and a second virtual machine, wherein each virtual machine of the plurality of virtual machines is for executing at least a predetermined one or more functions, wherein to execute the one or more functions the virtual machines are required to have various levels of security or limits of responsibility, the system comprising:
  a local non-transitory memory and a non-transitory memory removable from the computer;
  the plurality of virtual machines to automatically process a corresponding portion of the data from the multi-usage-data;
  a hypervisor that runs on a hardware layer of the computer and controls running of the plurality of virtual machines;
  the predetermined one or more functions include a data communication function and a data storage function, wherein:
    for the data communication function that transmits data,
      i. to an external system,
        authenticating at least one of the virtual machines to be used for transmitting data by an authentication module of the hypervisor, and
        verifying integrity and level of isolation of the at least one authenticated virtual machine in relation to at least one other virtual machine of the plurality of virtual machines; or
      ii. from the first virtual machine to the second virtual machine, when a level of security of the second virtual machine is higher than a level of security of the first virtual machine,
        filtering data to be transferred as a function of a type of the data and only data that is needed by a data transfer module of the hypervisor, and
      transmit data to the external system or to the second virtual machine after the verifying or the filtering;

for the data storage function that stores data processed by the at least one virtual machine of the plurality of virtual machines into one of the non-transitory memories, storing the data processed by the at least one virtual machine in the local non-transitory memory or in the non-transitory memory removable from the computer as a function of a confidence level of the data processed by the at least one virtual machine, wherein the data is stored on the local non-transitory memory when the confidence level is above a predetermined security threshold.

2. The system according to claim 1, wherein the hypervisor includes an authentication module that authenticates the at least one virtual machine of the plurality of virtual machines.

3. The system according to claim 2, wherein the authentication module verifies integrity of the at least one authenticated virtual machine.

4. The system according to claim 2, wherein the authentication module verifies a level of isolation of the at least one authenticated virtual machine in relation to the at least one other virtual machine of the plurality of virtual machines.

5. The system according to claim 1, wherein the non-transitory removable memory stores data from any of the virtual machines for which the level of security is lower than the predetermined security threshold.

6. The system according to claim 1, further comprising a checking module that checks the confidence level of at least one datum processed by the at least one virtual machine of the plurality of virtual machines, the at least one processed datum being stored locally in the computer only after it has been checked and found to be above a predetermined confidence level threshold.

7. The system according to claim 1, wherein configuration data used for starting up the at least one virtual machine of the plurality of virtual machines are not modified during running of the at least one virtual machine started up.

8. The system according to claim 1, wherein each of the virtual machines requires both the level of security and the limit of responsibility.

9. The system according to claim 1, wherein at least one limit of responsibility for a corresponding virtual machine of the plurality of virtual machines is different from another limit of responsibility for another virtual machine of the plurality of virtual machines.

10. The system according to claim 1, wherein one of the virtual machines is a management virtual machine that manages all other of the plurality of virtual machines of the system.

11. A device having a computer for automatic processing of multi-usage-data by a plurality of virtual machines (VM) including a first virtual machine and a second virtual machine, wherein each virtual machine of the plurality of virtual machines is for executing at least a predetermined one or more functions, wherein to execute the one or more functions the virtual machines are required to have various levels of security or limits of responsibility, the device comprising:

a local non-transitory memory and a non-transitory memory removable from the computer;

the plurality of virtual machines to automatically process a corresponding portion of the data from the multi-usage-data;

a hypervisor that runs on a hardware layer of the computer and controls running of the plurality of virtual machines;

the predetermined one or more functions include a data communication function and a data storage function, wherein:

for the data communication function that transmits data,
  i. to an external system,
    authenticating at least one of the virtual machines to be used for transmitting data by an authentication module of the hypervisor, and
    verifying integrity and level of isolation of the at least one authenticated virtual machine in relation to at least one other virtual machine of the plurality of virtual machines; or
  ii. from the first virtual machine to the second virtual machine, when a level of security of the second virtual machine is higher than a level of security of the first virtual machine,
    filtering data to be transferred as a function of a type of the data and only data that is needed by a data transfer module of the hypervisor, and
  transmit data to the external system or to the second virtual machine after the verifying or the filtering;

for the data storage function that stores data processed by the at least one virtual machine of the plurality of virtual machines into one of the non-transitory memories, storing the data processed by the at least one virtual machine in the local non-transitory memory or in the non-transitory memory removable from the computer as a function of a confidence level of the data processed by the at least one virtual machine, wherein the data is stored on the local non-transitory memory when the confidence level is above a predetermined security threshold.

12. The device according to claim 11, wherein one of the virtual machines is a management virtual machine that manages all other of the plurality of virtual machines of a corresponding system.

13. The device according to claim 11, wherein the hypervisor includes an authentication module that authenticates the at least one virtual machine of the plurality of virtual machines.

14. The device according to claim 13, wherein the authentication module verifies integrity of the at least one authenticated virtual machine.

15. The device according to claim 13, wherein the authentication module verifies a level of isolation of the at least one authenticated virtual machine in relation to the at least one other virtual machine of the plurality of virtual machines.

16. The system according to claim 11, wherein the non-transitory removable memory stores data from any of the virtual machines for which the level of security is lower than the predetermined security threshold.

* * * * *